April 19, 1927.
A. L. PUTNAM
1,624,974
WHEEL RIM AND ATTACHMENT THEREFOR
Filed June 14, 1926
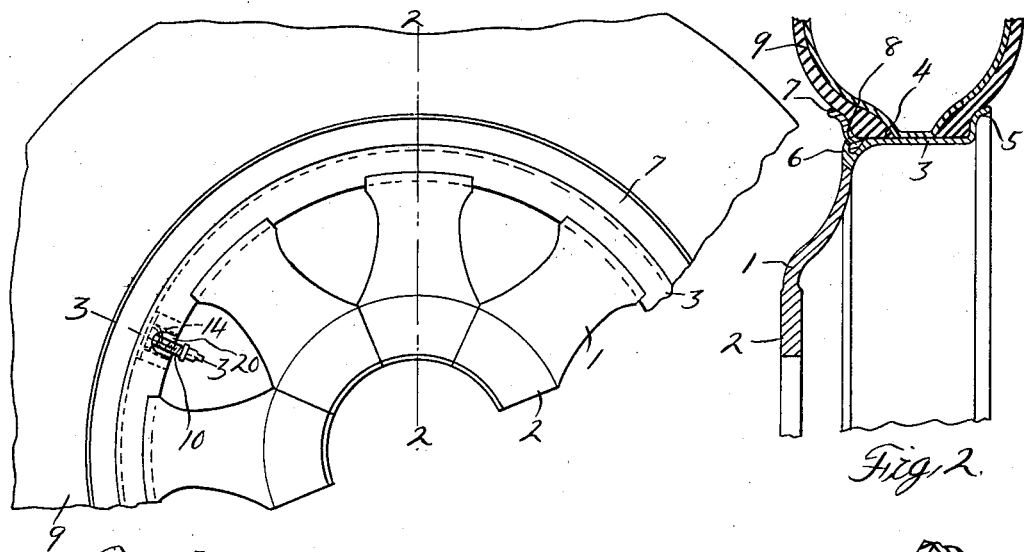
Inventor
Alden L. Putnam
By
Attorneys Patented Apr. 19, 1927.

1,624,974

UNITED STATES PATENT OFFICE.

ALDEN L. PUTNAM, OF DETROIT, MICHIGAN, ASSIGNOR TO WHITEHEAD & KALES COMPANY, OF DETROIT, MICHIGAN, A CORPORATION OF MICHIGAN.

WHEEL RIM AND ATTACHMENT THEREFOR.

Application filed June 14, 1926. Serial No. 115,993.

The invention relates to vehicle wheels and refers more particularly to vehicle wheel rims which are designed to carry pneumatic tires. One of the objects of the invention is to provide an improved construction of wheel rim having an elongated opening for receiving the valve stem of a pneumatic tire so arranged that the rim may be continuous at both ends of the opening and the tire may be readily applied or removed. Another object is to provide a shield at the inner side of the rim for protecting the valve stem and preventing dirt or the like entering the opening in the rim. Further objects of the invention reside in the novel features of construction and combinations and arrangements of parts as more fully hereinafter set forth.

In the drawings:—

Figure 1 is a side elevation of a portion of a vehicle wheel embodying my invention;

Figures 2 and 3 are cross sections, respectively, on the lines 2—2 and 3—3 of Figure 1;

Figure 4 is a cross section on the line 4—4 of Figure 3.

The body of the vehicle wheel, as shown in the present instance, has the metal spokes 1, the inner ends of which abut and are secured to each other to form the hub portion 2 of the body and the outer ends of which abut and are secured to the rolled metal rim 3. This rim has the base 4 with the permanent annular tire retaining flange 5 at its inner edge and the permanent annular flange 6 at its outer edge. The flange 6 terminates preferably within the extension of the outer face of the base 4 and serves to retain the detachable tire retaining flange 7 having a tongue portion engageable in the annular groove 8 located laterally adjacent the flange 6.

For the purpose of readily applying and removing the pneumatic tire 9, the valve stem 10 of the tube is of the angle type having the transverse portion 11 extending substantially parallel to the base 4 of the rim at its inner side and laterally toward the front of the wheel and terminating in the radially inwardly extending portion 12. The base 4 of the rim is formed with the elongated opening 13 which extends transversely thereof from the outer flange 6 to slightly beyond the median plane of the rim. 14 is a shield for the valve stem 10 located at the inner side of the rim and extending transversely thereof. This shield is preferably formed of stamped sheet metal and has a channel-shaped cross section closed at its inner end and formed with the foot flanges 15 at its edges closely fitting the inner face of the rim and secured thereto as by means of the rivets 16. The outer end of the shield is open and forms with the rim a lateral opening 20 for the passage of the outer end of the valve stem 10. As shown, the opening 20 is formed by slotting the portion of the rim below the annular flange 6 and the outer end of the shield terminates at a point such that the radially inwardly extending portion of the valve stem extends between and in the plane of the adjacent spokes.

To assemble the pneumatic tire upon the rim 3, the end portion 12 of the valve stem 10 is first inserted into the opening 13 of the rim with the tire tilted at an angle to the rim. The tire may then be moved laterally inward over the rim base and the detachable tire retaining flange 7 inserted into the annular groove 8, after which the tube may be inflated. To remove the tire, the tube is first deflated and the casing forced laterally inward a sufficient distance to disengage the detachable tire retaining flange 7 from the rim, after which the portion of the tire opposite the valve stem may be tilted laterally from the rim and the tire removed from the rim by a movement of the tire in a direction to draw the valve stem inwardly and away from the portion of the base of the rim having the opening 13.

From the above description it will be readily seen that I have provided a construction of wheel rim and attachment therefor which is so arranged that the tire may be readily applied to or removed from the rim and the valve stem is protected and at the same time dirt or the like is prevented from entering the opening in the rim for receiving the valve stem. It will also be seen that access may be readily had to the end of the valve stem for inflating or deflating the tube. Furthermore, it will be seen that the construction is such that it obviates the necessity of making a slot through the outer edge of the rim for receiving the valve stem.

What I claim as my invention is:

1. In a vehicle wheel, the combination with the wheel body, of a continuous rim upon said wheel body for receiving a pneumatic tire, said rim having a permanent annular tire retaining flange at one edge and a permanent annular flange at the other edge for engagement with a detachable tire retaining flange and also having an elongated opening extending transversely between said first mentioned flanges for receiving the valve stem of the tire and a channel-shaped shield secured to the inner side of said rim for protecting the valve stem, said shield having an inner closed end and also having an outer end provided with a lateral opening, said rim also provided with a lateral opening spaced substantially below the permanent annular flange aforesaid and registering with the opening in said shield for permitting passage of the end portion of the valve stem from the space inclosed by said shield and rim.

2. In a vehicle wheel, the combination with a wheel body, of a continuous rim upon said body for receiving a pneumatic tire, said rim having an annular tire retaining flange at one edge and an annular flange at the other edge and also having an elongated opening extending transversely between said flanges for receiving the valve stem of the tire and a shield at the inner side of said rim for protecting the valve stem, having an opening in one end thereof, said rim also having a lateral opening spaced below the annular flange aforesaid and registering with the lateral opening in said shield permitting passage of the end portion of the valve stem from the space inclosed by said shield and rim.

In testimony whereof I affix my signature.

ALDEN L. PUTNAM.